(12) United States Patent
Peterson

(10) Patent No.: US 7,617,145 B1
(45) Date of Patent: Nov. 10, 2009

(54) ADAPTIVE BIDDING INCREMENTS IN AN ONLINE AUCTION SYSTEM

(75) Inventor: Roe Peterson, Regina (CA)

(73) Assignee: Worldwide Farm Equipment Auctions.com Ltd., Saskatchewan (CA)

( * ) Notice: Subject to any disclaimer, the term of this patent is extended or adjusted under 35 U.S.C. 154(b) by 682 days.

(21) Appl. No.: 09/695,551

(22) Filed: Oct. 24, 2000

(51) Int. Cl.
G06Q 40/00 (2006.01)
(52) U.S. Cl. .................... 705/37; 705/35; 705/36 R
(58) Field of Classification Search ............. 705/35, 705/36 R, 37
See application file for complete search history.

(56) References Cited

U.S. PATENT DOCUMENTS

| | | | | |
|---|---|---|---|---|
| 6,230,147 B1 * | 5/2001 | Alaia et al. | ............ | 705/37 |
| 6,415,269 B1 * | 7/2002 | Dinwoodie | ............ | 705/37 |
| 6,813,612 B1 * | 11/2004 | Rabenold et al. | ............ | 705/37 |
| 2002/0023038 A1 * | 2/2002 | Fritsch et al. | ............ | 705/37 |
| 2002/0082971 A1 * | 6/2002 | Le et al. | ............ | 705/37 |
| 2003/0055775 A1 * | 3/2003 | McQuain | ............ | 705/37 |
| 2004/0193489 A1 * | 9/2004 | Boyd et al. | ............ | 705/14 |

FOREIGN PATENT DOCUMENTS

| | | |
|---|---|---|
| CA | 2345241 A1 | 3/2000 |
| WO | WO 02/13802 A1 * | 2/2002 |

OTHER PUBLICATIONS

GoDuke.com Auction website page, Bid Increment definition, printed Apr. 14, 2005.*
Public Notice, Federal Communications Commission, First Paging Service Spectrum Auction Scheduled for Dec. 7, 1999 Comment Sought on Reserve Prices or Minimum Opening Bids and other Auction Procedural Issues, Jun. 7, 1999, 7 pages.*
"Design of an Internet-Based System for Remote Dutch Auctions," Todd Rockoff et al., Internet Research: Electronic Networking Applications and Policy, vol. 5, No. 4, 1995, pp. 10-16.
"Online Auctions: Insights and Analysis," Ravi Bapna et al., Working Paper, Later Revised and Reprinted in Communications of the ACM as Insights and Analysis of Online Auctions, 1999, pp. 1-22.

* cited by examiner

Primary Examiner—Hani Kazimi
Assistant Examiner—Olabode Akintola
(74) Attorney, Agent, or Firm—Ropes & Gray LLP

(57) ABSTRACT

A system and method is disclosed for the conduct of an online auction in which bidders are able to place bids on lots in the auction by selecting from a plurality of predetermined bid increments provided by the system. The predetermined bid increments provided by the system are adjusted during the auction of a specific lot to adapt to sale conditions and maximize the price obtained at auction.

16 Claims, 6 Drawing Sheets

4A: HTTP send browser request to server to enter auction/view data (get doc from server)
4B: HTML send auction info from server
4C: Bidder selects bid increment
4D: HTTP post bid details to server
4E: Server receives data and logs bid
4F: Server updates price/status docs
4G: HTML send updated auction info from server to browser

ADAPTIVE BIDDING INCREMENTS IN AN ONLINE AUCTION SYSTEM

This invention is in the field of online auction systems.

BACKGROUND

Auction sales are proving to be as popular and exciting a selling method for products and services over the Internet as historically auctions have been in their live or physical sense.

There have evolved at least two different methods of conducting an auction sale online, the first being a static auction where there is no auctioneer and where the auction is basically open for a period of time within which a bidder can at their leisure submit a bid on a product and then check back later to see if it is necessary to submit another bid. The second type of auction which is now becoming more available over the Internet and which offers a higher level of excitement and quicker resolution for the seller is that of a live auction. A live auction consists of a moderated bidding session within a short period of time which in most ways resembles a bidding session at a physical auction sale except insofar as the bidding takes place over a computer network rather than in person. In the case of higher priced items, the live or combined physical and live auctions over the Internet offer greater potential to the seller, since greater excitement can be generated within a limited bidding session and a higher price obtained for products if more bids are placed within that time frame.

SUMMARY OF THE INVENTION

It is the object of the present invention to provide an online auction method and system which will induce higher bidding by bidders participating in the auction than traditional systems wherein a bidder was able to simply enter a bid amount for transmission to the system which would be entered in the auction and might then easily be surpassed by the entry of another bid by another bidder. The system and method of the present invention will allow bidders to place bids in an auction sale online by selecting from one or more predetermined bid increments which are made available to them. The use of predetermined bid increments in a live auction sale format should increase the amount of revenue, since bidders to some extent where they wish to place a bid that might have been $350 might simply select a button which was a predetermined $500 bid, depending on the level of excitement and time remaining or involved in the auction session. The present invention proposes to increase the revenue recovered from auctions in this fashion by revising said predetermined bid increments during the conduct of the sale of a particular auction lot. For example, if a predetermined bid increment of $1,000 is provided to bidders engaged in a bidding session and resistance begins to build to the $1,000 predetermined bid increment, the system or method calls for the revision of the predetermined bid increment, for example maybe to $500, which might spur additional activity in the bidding session. These predetermined bid increments and their revision during the sale of a particular auction lot will adapt to the circumstances of a particular lot or the overall circumstances of the sale and will potentially spur additional bidding activity in a bidding session that might otherwise be drawing to a close. The system and method of the present invention is specifically targeted towards use in a "live" online auction format, a live online auction being an online auction in which there is a short time period within which bidding is able to take place, or alternatively even an online auction in which a live auctioneer is involved in some fashion. It will also however be understood that the adaptive bid increment method of the present invention could also be practiced in a static auction, and that is also contemplated within the scope of the present invention.

There is disclosed by the present invention a method of conducting an online auction comprising providing an auction Web site system which will conduct an auction in a number of steps. The first step of the auction process conducted by the Web site system in respect of an auction lot is to assign at least one predetermined bid increment to the auction and to then display to the browser of a bidder via the Web site system the current auction price of said lot as well as said predetermined bid increments. Bidders would then be allowed to place bids by selecting from said predetermined bid increments, the amount of the bid being the current auction price plus the selected predetermined bid increment. The bids would be transmitted to and recorded in said Web site system. Upon occurrence of a revision event, the predetermined bid increments would be revised and the new revised predetermined bid increments would be displayed to bidders. Further bidding could then take place using these new revised predetermined bid increments. Finally, upon occurrence of an auction-closing event, the system would accept no further bids and the winning bidder would be determined.

A "revision event" would be a trigger detected by the auction Web site system which would result in the revision of the predetermined bid increments being offered to bidders. A number of different types of revision events are contemplated, both manual and automated. A manual revision event might comprise a manual initiation of the predetermined bid increments by an operator of the Web site system. Alternatively, the revision event might be a pre-programmed condition which is detected by the Web site system, such as a condition related to the passage of time between placement of bids or the like. Where the revision of predetermined bid increments was necessary, the revision, similar to the revision event itself, could either be manual or automated. The predetermined bidding increments could be revised by input from an operator of the Web site system, resulting in a manual revision thereof, or alternatively the predetermined bidding increments could be revised on the basis of a pre-programmed calculation or formula contained within the Web site system.

An "auction-closing event" would be a condition detected by the Web site system which resulted in the closing of bidding on the auction lot. An auction-closing event could comprise either the manual initiation of the close of the auction by an operator of the Web site system or a pre-programmed condition which is detected by the Web site system. Again, if it is a pre-programmed condition monitored by the Web site system, the auction-closing event might be related to the passage of time between the placement of bids or some other condition.

One or more predetermined bid increments might be offered to bidders with respect to an auction of a lot within the system and method of the present invention.

Also disclosed is a Web site system for conducting online auctions, such Web site system being operatively connected to communicate with bidders, and said Web site system including a bid management system which manages a bid database containing details of bids placed by bidders in respect of auction lots. The system would also include an auction control system, including an increment setting component, which would set predetermined bid increments in respect of auction lots being auctioned. The auction control system would conduct an auction by assigning an opening auction price to an auction lot as well as assigning at least one predetermined bid increment to this auction via the increment setting component. Prospective bidders would be displayed the current auction price and predetermined bid increments in respect of said auction by the Web site system and bidders would then be allowed to place bids in said auction by selecting one of said predetermined bid increments. The total amount of a bid would be calculated by adding the predetermined bid increment selected to the current auction price at the time of the submission of the bid. The bids would be transmitted from the bidders to the Web site system for recordal in the bid database, and upon acceptance and recordal of a bid, the system would refresh the display of the current auction price to prospective bidders viewing the auction session.

The auction would be monitored for the occurrence of a revision event and, upon the occurrence of same, the increment setting component would revise the predetermined bid increments in that auction and refresh the display thereof to prospective bidders. As outlined above, the revision event which might be monitored could either be a manual flag, or alternatively some type of pre-programmed condition which would be monitored by the system.

Once the increment setting component had revised and refreshed the predetermined bid increments, additional bidding would be allowed until the occurrence of an auction-closing event, which the system would monitor as well. Upon occurrence of an auction-closing event, which again can either be manual or a pre-programmed condition, the system would accept no further bids in respect of that auction and would determine the successful bidder based on bids received and recorded in the bid database Bidders could interact with the Web site system of the present invention via a Web browser.

Also disclosed is a computer program for accomplishing the auction method of the present invention.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
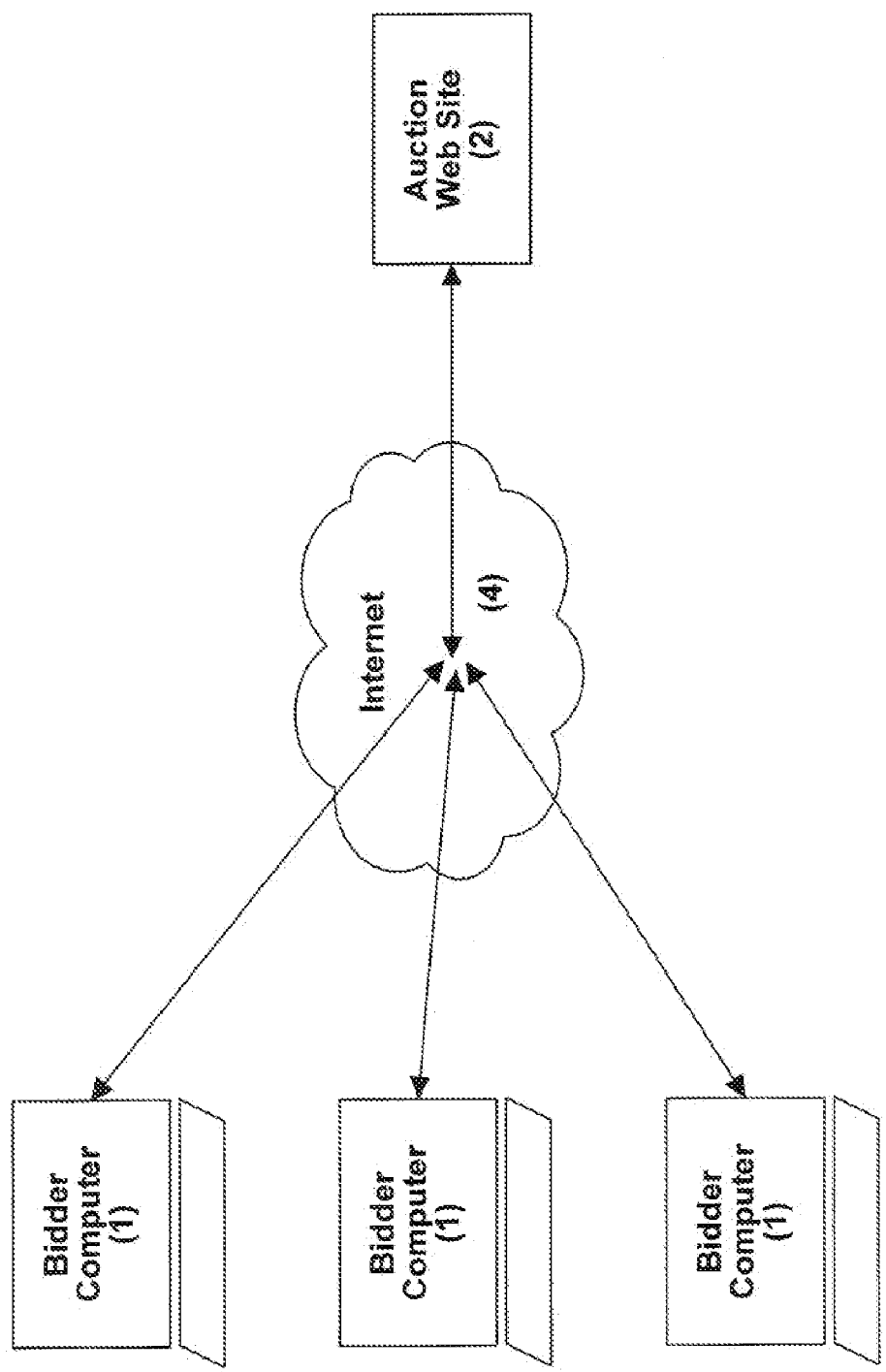
FIG. 1 is a general concept diagram of the system and hardware of one embodiment of the present invention.

To facilitate a complete understanding of the invention, the description of the preferred embodiments herein are arranged within the following sections:

1. Glossary of Terms and Acronyms
2. Overview of System Components and Operation
3. Merchandise Control Function
4. Bid Control Function
5. Bidder Control Function
6. Auction Control Function
7. Conclusion Glossary of Terms and Acronyms The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both a distributed collection of interlinked, user-viewable hypertext documents (commonly referred to as Web documents or Web pages) that are accessible via the Internet, and the client and server software components which provide user access to such documents using standardized Internet protocols.

Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web site. A computer system that serves informational content over a network using the standard protocols of the World Wide Web. Typically, a Web site corresponds to a particular Internet domain name, such as abc.com," and includes the content associated with a particular organization. As used herein, the term is generally intended to encompass both the hardware/software server components that serve the informational content over the network, and the "back end" hardware/software components, including any non-standard or specialized components, that interact with the server components to perform services for Web site users.

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. There are also secure types of protocols or additions to the basic HTTP protocol used on the Internet. One of these, which is used to add security to transmissions, is a secure socket layer protocol, also referred to as "SSL".

"HTML" (Hypertext Mark-up Language). A standard coding convention and set of codes for attaching presentation and linking attributes to informational content within documents. During a document authoring stage, the HTML codes are embedded within the informational content of the document and when the Web document (HTML document) is subsequently transferred from a Web server to a browser, the codes are interpreted by the browser and used to parse and display the document. In addition to specifying how the Web browser is to display a document, HTML tags can also be used to create links to other Web documents.

Overview of System Components and Operation

FIG. 1 illustrates the general architecture of an auction Web site system operating in accordance with the present invention. It includes at least one bidder computer (1) and an auction Web site system (2), which are linked together by the Internet (4). In FIG. 1 there are three bidder computers (1) shown, but it will be understood that the number of bidder computers (1) which could be engaged in an auction conducted by the present system are limited only by the communications or hardware capacity of the auction Web site (2) and that all such numbers are contemplated within the scope of the present invention.

The auction Web site system (2) is a site that provides various functionality for allowing the bidders to place bids on products, services or other merchandise lots for sale by auction. Typically, this site will be operated by a business entity (referred to herein as the "auctioneer") that handles the operation of auction sales.

The bidder computer (1) might be any type of a computing device that would allow a user/customer to interactively browse Web sites via a Web browser (5). For example, the bidder computer (1) might be a personal computer running any one of the Microsoft Windows™ operating systems. It will be understood that other types of computing devices running other operating systems could also be used as the bidder computer (1) so long as they were able to connect to the Internet (4) and accommodate the perusal interaction with an auction Web site system (2) by a bidder Web browser (5) installed therein, and that all such other devices are also contemplated within the scope of the present invention.

It will be understood that both products or services could be auctioned using the system of the present invention and that auctioning of any type of commodity is contemplated within the scope of the present invention.

The auction Web site system (2) of the present invention consists, hardware wise, primarily of a server (3) with the necessary software components installed therein to conduct the auction as well as to communicate with the bidder computers (1). Further attributes and requirements of the server (3) and the software components installed therein will become apparent from the description to follow. The auction Web site system (2) will interface with a bidder computer (1) by way of a bidder Web browser (5).

Software components installed on the server (3) would include a bid management component (15) which could store, administer and monitor the particulars of bids placed by various bidders in the auction of auction lots by the system of the present invention.

Figure 3:
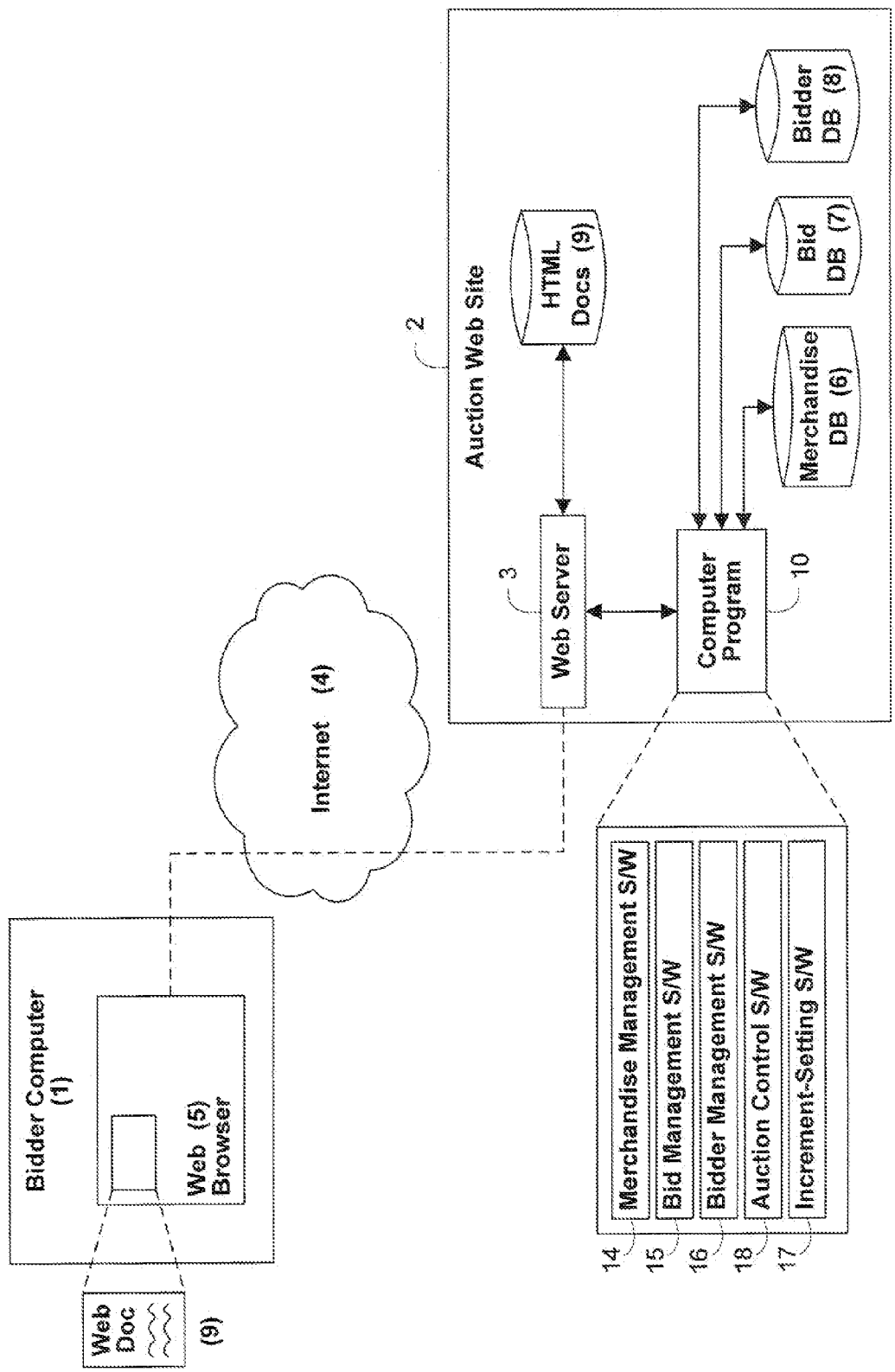
FIG. 3 is an architectural drawing of an auction Web site system in accordance with one embodiment of the present invention.

FIG. 3 demonstrates the apparatus of one embodiment of the present invention in more detail. The auction Web site system (2) would also include a bid database (7) in which could be stored the particulars of bids placed by various bidders on auction lots being auctioned. It will be understood that the bid database (7) could also contain additional information to extend the functionality of the system of the present invention, but the baseline requirements for the proper operation of the system would be some type of a bidder identifier as well as the bid amount and the auction lot in respect of which the bid is placed. The Web site system (2) also includes a plurality of HTML documents or the like (9) which are used and served to the bidder's Web browser (5) during the course of the conduct of an auction according to the system of the present invention.

In operation, a bidder would access the auction Web site (2) by using a standard Web browser (5), such as Microsoft's Internet Explorer™ or Netscape's Navigator™, which uses the HTTP protocol to communicate with the Web server (3) of the Web site (2). The Web server (3) acts as a local store of documents 9 (in the form of HTML or "Web" documents) which can be requested, retrieved and viewed by the customer via the Web browser (5). This catalogue of HTML documents 9 could include various descriptive information regarding auction lots offered for sale and would also include documents to be viewed and used in the placement of bids with the Web site (2). Through the browser (5), the Web site (2) and the associated Web server (3), a bidder would be able to transact business with the auctioneer.

The HTML documents 9 served by the Web site (2) would include particular documents or 5 pages which would be used by bidders to place bids on items in an auction. By way of special hyperlinks or otherwise, the predetermined bid increments associated with a particular auction lot would be displayed to the bidder and the bidder could then, via their Web browser (5), select one of those special hyperlinks which would transmit the amount of the selected predetermined bid increment and other bidder identifying information from the browser (5) to the Web site (2) for recordal by the bid management system (15). Typically, one such hyperlink would be provided for each predetermined bid increment available with respect to the auction lot and the bidder could simply click one of those links to select their bid increment. Alternatively, a menu or other method of HTML coding could be used and it will be understood that other variants resulting the same provision of the predetermined bid increments to the bidder for selection are contemplated within the scope of the present invention.

In one embodiment or implementation, the auction Web site (2) comprises a merchandise database containing information about various auction lots to be offered for sale by the auctioneer via the system of the present invention. Certain documents in the HTML catalogue 9 might then be query templates which will extract certain information from the merchandise database (6) for display to a bidder via their Web browser (5). The computer program (10) of the auction Web site (2) would also use the information from the merchandise database (6) in the conduct of auctions of various auction lots therefrom.

A bidder would need to provide identifying information to the Web site (2) along with their bid in order that the bid can be properly catalogued and attributed back to the appropriate bidder at the time of selection of a winning bidder at a closed auction level. In one implementation of the auction Web site (2), the Web site (2) might also include a bidder database (8) which contains details of registered bidders who are able then to transact business with the auctioneer. The bidder database (8) might be managed by a bidder database maintenance component (16) of the computer program (10) in the server (3), which might also assign some type of an identifier or symbol to each registered bidder which the bidder could then use as an abbreviation to identify themselves to the system in placing a bid.

Since the identity of a bidder is required in order to validate or properly log a bid submission in the bid database (7), the bidder would either need to identify themselves in the bid request transmitted to the Web site system (2) from their browser (5), or else the auction Web site (2) might utilize Cookie technology to allow the bidder to identify themselves from their computer at one point and the Cookie would then be stored on the bidder computer. The Cookie would be retrieved from the bidder computer (1) by the Web server (3)

at the time of receipt of a bid request, and the software (10) within the Web server (3) would then execute a query against previously stored bidder information in a bidder database. Any of a variety of alternative techniques could be used to identify the bidder, including prompting the bidder for a user ID and/or using URL information returned by the bidder's Web browser (5).

The occurrence or detection of what is termed herein as an "revision event", would result in the revision of the predetermined bid increments associated with the auction in progress. The revision event might be any number of preprogrammed conditions which the Web site system (2) and auction software (18) is programmed to detect, or alternatively might even be some type of a manual initiation process. In any event, upon detection of a revision event, the increment setting software component (17) will revise the predetermined bid increments, update the HTML documents (Step 4F in FIG. 4) and upon any changes made in terms of the documents at 4F, Step 4G would also take place which would be an HTML refresh or send of the new documentation to any browser (5) connected to the auction session.

Figure 5:
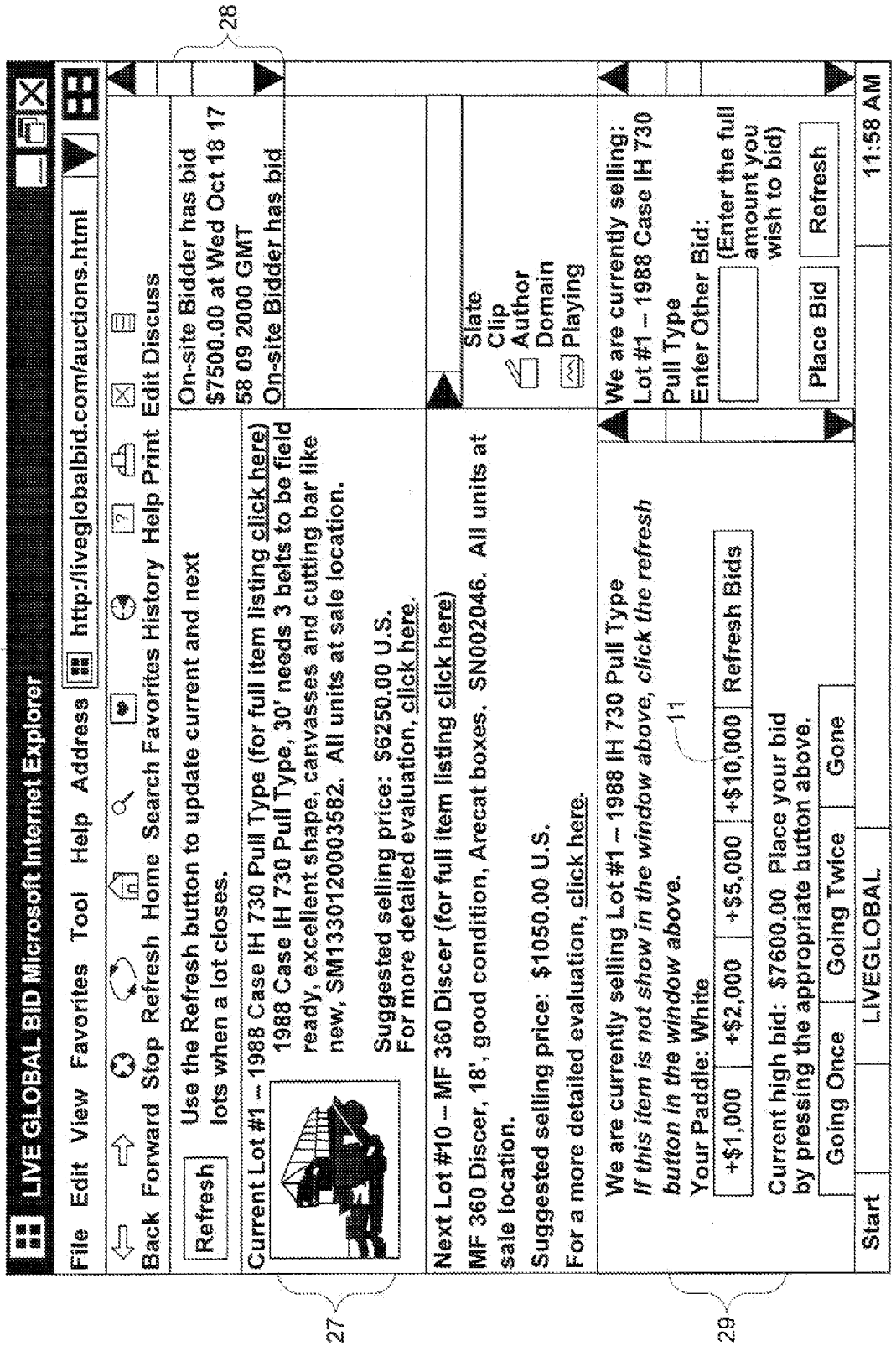
FIGS. 5 and 6 are sample Web pages which might be used in the conduct of an auction in accordance with the present invention.
Figure 6:
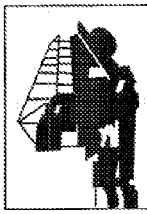

The revision of the predetermined bid increments in an auction conducted in accordance with the present invention is demonstrated by the sample displays of FIGS. 5 and 6. The predetermined bid increments have been revised by the increment setting software component (17) at some point after the display of the screen in FIG. 5, and then the screen in FIG. 6 is the refreshed status information which would be updated and displayed in all the bidder browsers (5) connected to the auction session.

As outlined in further detail above, bidding would cease and the auction would close upon detection of an auction-closing event by the auction software component (18).

The bidding system of the auction of the present invention centers around the placing of bids in accordance with a set of predetermined bid increments. For example, a particular lot might open bidding at $4,000, and the system might then increase the bid price on the item in increments of $2,000 at a time, if there is a bidder in the auction who is willing to bid that much money. In this case there is a computer program (10) present in the Web server (3) which can assign the predetermined bid increments on individual auction lots and monitor the acceptability or non-acceptability of those increments to the crowd by monitoring bid traffic.

When an auction lot is placed for sale, the site server (3) would serve HTML documents or other content to the Web browsers (5) of the bidders displaying the current asking price for the item as well as the preset bid increments with respect to that item. The system might provide only a single preset or predetermined bid increment, or more than one predetermined bid increment might be provided. Various implementations of the actual selection process for a predetermined bid increment can be contemplated. For example, various software technology such as JAVA™ or the like could be used to provide an interactive menu, set of buttons or other interface by which a bidder through their browser window (5) could select a predetermined bid increment (11). A bidder places a bid by selecting a predetermined bid increment as provided by the Web site system (2), which bid is then recorded in the bid database (7) and communicated to other users by way of refreshing their browsers (5) to show the new current asking price for the item.

The predetermined bid increments (11) of the present system are not static as they are in the case of existing auction systems. For example if three different bid increments of $1,000, $5,000 and $10,000 are provided and the bidder can only select from one of those predetermined bid increments, the predetermined bid increments of the present invention will be adjusted according to the conditions of the sale. Upon occurrence/detection of a "revision event" (ie. no one is placing further acceptable bids), the predetermined bid increments (11) will be recalculated or reset and the revised predetermined bid increments will be communicated to the bidders via their browsers (5) and further bidding can then take place.

In the case of the auction example outlined above, where the opening price was $4,000 and the system was bidding the item up $2,000 at a time, let us assume that after someone bid $10,000 no one would select the next $2,000 increment, to a $12,000 bid. The resistance to an increased price in that amount, or the failure to receive a bid within a certain period of time might be the "revision event" which triggers a revision of the predetermined bid increments. For example, by lowering the top predetermined bid increment from $2,000 to $1,000, the auctioneer might receive a bid for $11,000. It may in fact be the case that at that $1,000 bid increment the bidding will exceed the $12,000, depending on the behaviour of the bidders and the sale circumstances. In any event, it is the adaptive nature of these predetermined bid increments which is at the heart of the present invention. It will be understood that there might even be contemplated a scenario where a "revision event" resulted in the raising of the bid increment rather than the lowering thereof. In any event, the adaptive nature of the predetermined bid increments of the system of the present invention allows for the auction system of the present invention to maximize the sale price of every item and to adjust the sale circumstances on every item to fit the attitude of the crowd or the individual circumstances of that lot.

FIGS. 5 and 6 are sample screen displays which demonstrate the adaptive nature of the predetermined bid increments (11) of the present invention. There is shown in the screen sample (26) a variety of information for display in a bidder's browser (5). For example, the information shown at (27) is descriptive information about the auction lot being auctioned, which descriptive information would come from a merchandise database (6) as outlined herein. At (28) there is shown another frame which shows a running total or history of bids in respect of the auction lot having been received and logged in the bid database (7). The core of the present invention, being the adaptive predetermined bid increments, are shown at position (29) on the screen display. In this particular case of this auction, in the opening screen of FIG. 5, the four predetermined bid increments (11) which are shown are $1,000, $2,000, $5,000 and $10,000. At some point during the auction of this lot #1, the details of which are shown at position (27), a revision event occurs which likely results from the development of a resistance to making any higher bids on the lot in the full amount of the predetermined bid increments (11) which are shown. The precise revision event could be any number of conditions which the system might detect, as will be outlined in further detail below, but in the case where the revision event was related to a passage of time between the placement of bids, the increment setting component would revise the predetermined bid increments as has been done in this case, as it can be seen that the predetermined bid increments (11) have been lowered to $250, $500, $1,000 and $5,000. Where people were not previously prepared to make another bid of a full $1,000, the new availability of the $500 and $250 bid increments (11) might incite further bidding activity and encourage one or more bidders to place bids in those denominations. In the case of the embodiment of FIG. 5, where it is shown that the current high bid is $7,600, if a bidder were to select the $2,000 predetermined bid increment shown, the amount of the bid which would be recorded in the bid database (7) would be $9,600, namely the current auction price plus the selected predetermined bid increment. The system would then refresh the current auction price of the item with the details of such a bid and transmit that information to bidders engaged in the bidding session.

Upon selection of a predetermined bid increment by a bidder at their browser (5), this bid increment and bid indication would be transmitted to the auction Web site system (2) and its associated server (3), where it could be recorded in the bid database (7) and the current auction price of the item updated if the bid is validated. The amount of the bid would be the current auction price at the time the bid was placed, plus the amount of the bid increment selected by the bidder. The Web server (3) of the auction Web site system (2) could then revise and refresh the Web pages 9 which have been served to the browsers (5), to show the updated auction status to bidders engaged in the auction. In addition to the current auction price and the predetermined bid increments available at that time, it will be understood that other information might also be served to the browsers (5) from the server (3) and that all such system modifications are contemplated within the scope of the present invention as well.

The "revision event" which would trigger the revision or adjustment of the predetermined bid increments available to bidders in the auction of a particular merchandise lot could be any number of things. For example, where a human operator was monitoring the conduct of the auction of the various merchandise lots by the Web site system (2) of the present invention, the operator of the system might determine that a revision of the predetermined bid increments available to the bidders in the auction at that time should be revised, and as such a manual trigger indication sent to the server (3) would be the revision event. It will be understood that the manual triggering of a revision of the predetermined bid increments might simply be that, namely a trigger which would result in the system recalculating or revising the predetermined bid increments available to bidders, or the operator might actually input the new revised bid increments which would then in turn be refreshed or communicated to the bidders engaged in the auction via their browsers (5).

Other revision events which are contemplated might include the passage of a certain period of time between bids, which again increases the excitement in the auction, because bidders know that they only have a certain period of time, likely measured in a number of seconds, to place additional bids before the bid increments will be adjusted, allowing different bidders to engage in competition for the particular merchandise lot; or as outlined below, in the case of an auction closing event, to result in the winning of the auction by having the highest bid at the time of the close of the auction. It will be understood that many other types of auction variants could be accommodated by this and that any type of a calculation or event which results in a revision of the predetermined bid increments offered to bidders on the system is a revision event and is contemplated within the scope of the present invention.

The system (2) will continue to accept bids at the revised predetermined bid increment levels until another revision event is detected, or alternatively until an "auction-closing event" occurs. The auction-closing event would cease the acceptance of bids by the system (2) on the particular lot being auctioned and would result in the calculation or determination of the winning bidder by review of the bids on that lot stored within the bid database (7). As in the case of the revision event, outlined above, it can be contemplated that there are many different types of occurrences or events which could be classed as an auction-closing event. Again, in the case of an operator manning the system (2), the operator might manually close the auction, which would obviously be an auction-closing event. Also the auction-closing event might be the passing of a certain period of time within a certain level of revised predetermined bid increments without receipt of any bids. Again, as in the case of the revision events outlined above, it will understood that many different types of auction-closing events can be contemplated within the scope of the present invention and that all such auction-closing events are intended to be covered by the scope of the claims herein.

Figure 2:
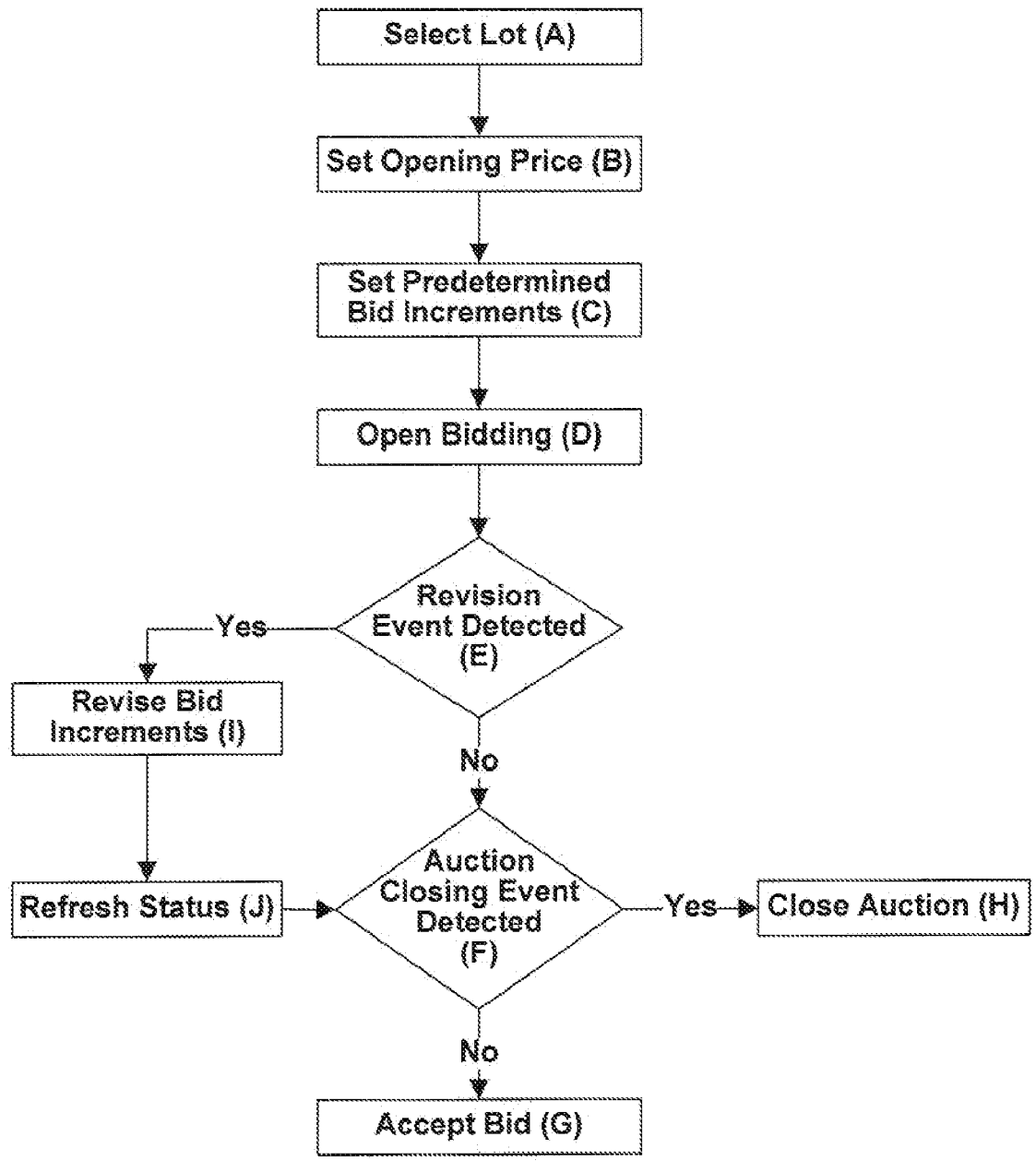
FIG. 2 is a flow chart of one embodiment of the auction method of the present invention.

Switching to FIG. 2, the method of provision of adaptive bidding increments in an online auction system is shown in flow chart form. The auctioneer or system would first select a lot for auction, shown at Step A. An opening price and at least one predetermined bid increment in respect of the lot would then be determined, B and C. Upon the opening of bidding, bidders could make bids by selecting one of the predetermined bid increments provided to them with respect to the auction lot, G. If during the course of accepting bids at G, or if no bids are being accepted or received, the system detects the occurrence of a revision event, shown at Decision Block E, the bid increments will be revised and the status of the auction including the revised predetermined bid increments, shown at J, will be communicated to the browsers or bidders involved in the auction.

Referring to FIGS. 5 and 6, a preferred embodiment of an auction status display form is shown, as might be seen in the Web browser (5) of a bidder. This form requests that the bidder select a predetermined bid increment and provide their identifying information. Many alternative formats to this are possible and these are only considered to be representative of the types of information that might be displayed or requested by the system of the present invention.

Similarly, shown at Decision Block F, where an auction-closing event is detected, the auction of that particular lot would be closed and the successful bidder determined based on the bids which had been accepted to that point.

The following sections outline in more detail some of the various embodiments or functions which might be used in conjunction with the present invention.

Merchandise Control Function

The Web server (3) of the auction Web site system (2) includes a computer program (10) which, through various software components, would carry out the administration and operation of the system. One element of the computer program (10) could be a merchandise database maintenance component (14) which would be responsible for the upkeep of the records of merchandise lots stored in a merchandise database (6). Each record of the merchandise database (6) could correspond to an auction lot which was to be auctioned using the auction Web site system (2) of the present invention. The merchandise database (6) would be stored in the memory of the server (3) and the merchandise database maintenance software component (14) could be any software component capable of accessing and administering this database (6).

It will be understood that the database structure of the merchandise database (6) could be any type of a database structure which could be administered by a software component (14) within the Web server (3) and that all types of data structures are contemplated within the scope of the present invention.

The first function of the merchandise database maintenance software (14) would be to maintain any changes made to records in the merchandise database (6) as a result of or during auctions conducted by the remainder of the system. As well, the merchandise database maintenance software (14) could be responsible for serving information from the merchandise database (6) either to other software components within the system (2) or directly to the browser (5) of a bidder in certain circumstances. While beyond the immediate scope of the present invention, it will be understood that the merchandise database maintenance software (14) could also allow for administration and adding new lots to the database (6) or removing lots from the database (6) or archiving information therefrom upon completion of various auction sales.

A merchandise database component (14) might also interact with the increment setting component (17) of the system (2), discussed in further detail below, insofar as predetermined parameters for the setting of bid increments with respect to individual lots stored within the database (6) might be stored within the database (6) along with the remainder of the information pertaining to that particular lot, and the increment setting component (17) might need to access this information or use this information in the setting of predetermined bid increments (11) with respect to each lot in the database (6).

Bid Control Function

A bid database maintenance component (15) would be present in the program (10) to maintain the bid database (7).

The bid database (7) would be used to record various bids placed on lots for auction within the course of an auction of lots from the merchandise database (6). The bids recorded in the bid database (7) could then be reviewed by the auction control component (18) upon completion of an auction to determine the winning bid. The bid database (7) could also be used to maintain a history of the various auctions conducted by the system (2) of the present invention.

It will be understood that the type of information to be stored in the bid database (7) again could vary in levels of complexity. Likely, the base information which would need to be stored would be the total bid price (13), an identifier of the bidder which might be linked to a bidder database (8), discussed in more detail below, as well as an identifier of the merchandise lot within the merchandise database (6) upon which the bid was placed. Other data checking fields in the data structure might include date and time of bids, validation flags or the like. It will be understood that the bid database maintenance component (15) is responsible for the maintenance of the bid database (7).

The bid database (7) would, in one embodiment, be a database structure containing a plurality of records, each record corresponding to a bid placed by a bidder with respect to a merchandise lot contained in the merchandise database (6). It will be understood that the structure of the bid database (7) could actually be any type of a database or other file structure which is accessible to the computer program (15). Similarly, the bid database software component (15) could be any software component which is capable of accessing and administering the particular database structure chosen for the bid database (7).

Bidder Control Function

In addition to maintaining the bid database (7), the computer program (10) within the server (3) might also include a bidder administration function or software component (16) responsible for the maintenance of a bidder database (8) or other data structure tracking necessary information with respect to bidders participating in auction sales being conducted on the system (2) of the present invention.

Such a bidder database (8) would contain the necessary information to keep track of people bidding on items in auctions. In addition to actual identification and/or bidder identifiers which could be used in the placement of bids, each record of the database (8) might also include address information or the like for coordinating the delivery of products or services purchased in auctions as well as any other internally useful information. The bidder administration software (16) might also include or comprise an enrolment software whereby upon accessing a certain area on the auction Web site system (2) a new bidder could submit registration information or enrolment information to the bidder administration software (16) which would result in the creation of a bidder identifier and/or the initialisation of a bidder record in the bidder database (8) on behalf of that bidder, who is then a registered bidder on the system (2). It will be understood that in most cases it will be necessary for some type of registration to take place so that the bidders involved in various auctions can be tracked.

Alternatively, where no enrolment software was included in the bidder administration component (16), the information maintained within the bidder database (8) might be created and administered manually by the operator of the Web site system (2).

It will be understood that the structure of a bidder database (8) could actually be any type of a database or other file structure which is accessible to the computer program (10).

Auction Control Function

At the heart of the system (2) of the present invention is the auction control function which is carried out by an auction control component (18) of the software (10) within the server (3). In the embodiment shown, the auction control software (18) will interface directly or indirectly with the databases (6), (7) and (8) for the purposes of authenticating bids received, recording bids received in the bid database (7) and displaying merchandise data from the merchandise database (6) in the course of conduct of an auction.

As part of the auction control component (18), there is an increment setting component (17) which is responsible for the assignment or calculation of predetermined bid increments on auction lots.

As outlined in further detail herein, the basic concept of the present invention is to provide an online auction system in which bids are placed on lots being auctioned by selecting a predetermined bid increment from a number of predetermined bid increments provided to prospective bidders by the system. When resistance develops to the level of the predetermined bid increments, which resistance might be one example of a revision event, the system will revise (in most cases lower) the predetermined bid increments to endeavour to incite further bidding on the lot.

Figure 4:
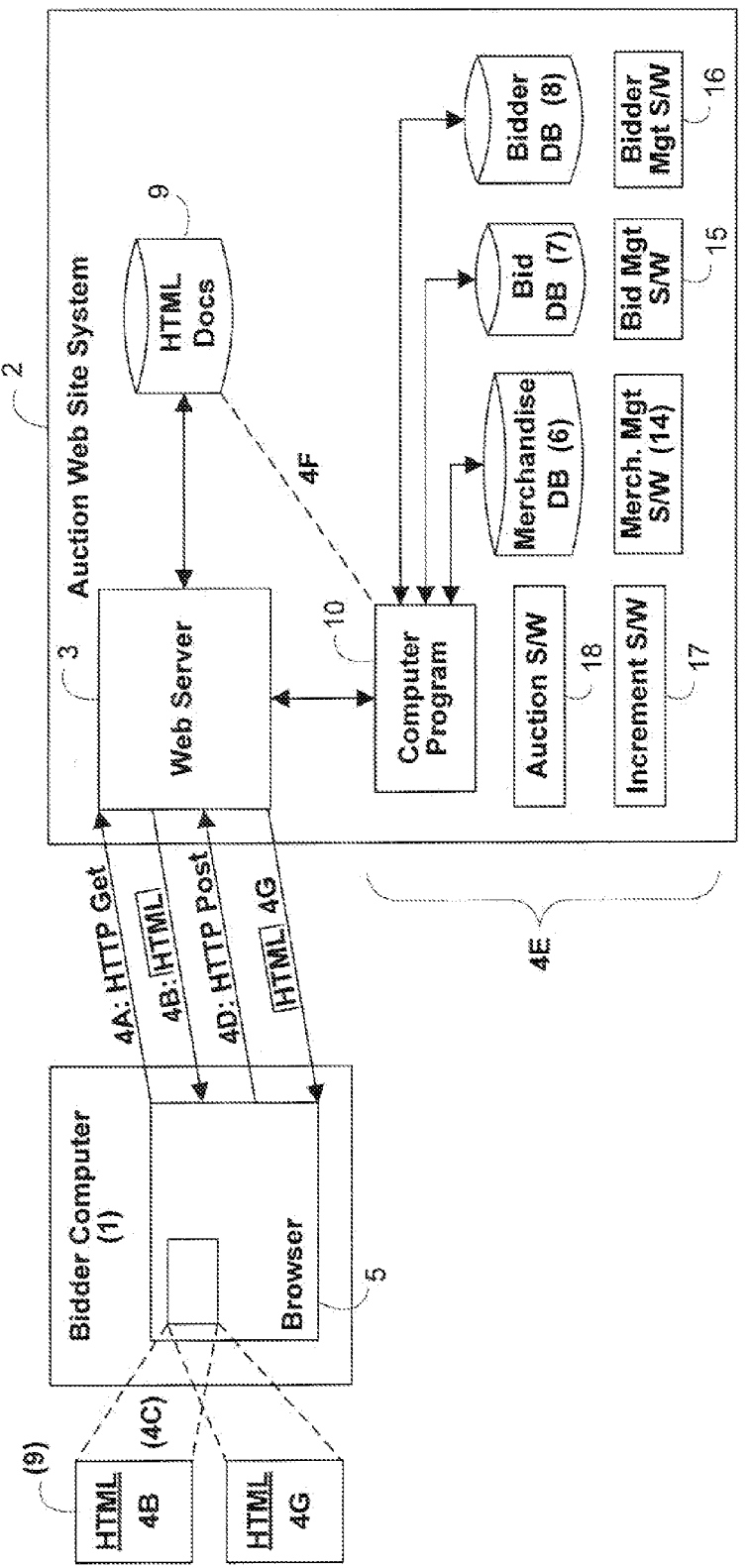
FIG. 4 demonstrates the flow of a typical auction through the Web site system of FIG. 3.

FIG. 4 demonstrates the transaction flow in the auction of an auction lot using one embodiment of the system of the present invention. The embodiment used in FIG. 4 is an embodiment of the system of the present invention which includes a merchandise database (6), a bid database (7) and a bidder database (8), each with their own software management components (14), (15) and (16) respectively. It will be understood that in a very basic embodiment of the invention it may not be necessary to maintain all of this information in the computer system of the Web site (2) and the obvious variations thereon will be contemplated within the scope of the present invention.

The browser request, shown at 4(*a*), would be transmitted from the browser (5) to the Web server (3), and upon receiving this request for auction information, the server (3) would transmit an HTML document (9) back from its document repository to the browser (5) for display to the bidder. This is shown at Step 4(*b*). The HTML document transmitted would show the status information of the auction, etc., and might for example resemble the display of FIG. 5.

The bidder, should they wish to do so, would place a bid in the auction by selecting one of the predetermined bid increments outlined on the HTML document (9) which had been transmitted at Step 4(b) for display in the browser (5). The selection of a predetermined bid increment, by way of selecting a link or whatever other particular content design is provided for the selection of a bid increment, is shown at Step 4(c). The bid selection made at Step 4(c), along with whatever other identifying information was necessary, would be sent from the browser (5) to the server (3), shown at Step 4(d).

The next step in the process is the server (3) receiving the bid data which had been posted from the browser (5), which is illustrated at Step 4(e). The bid data which is received is processed by the computer program (10) and logged into, in this case, the bid database (7) and then any event is recorded within the Web server (3) for later use in the determination of the successful bidder. Upon processing of a bid, the auction software (18) will also update the current auction price of the auction lot being auctioned, and the HTML documents (9) on the server which pertain to the particular auction in question are updated with the new auction status and price. This status update to the document repository of the server (3) is shown at Step 4(f).

The next step in the handling of the bid upon its acceptance, following the update of the status of the auction on the server (3) shown at Step 4(f), is to refresh or retransmit the status information regarding the auction to any bidder browser (5) which is currently connected to the auction. This is shown at Step 4(g). The updated information is then displayed in the browser (5). Steps 4(f) and 4(g), namely the internal update of the HTML documents on the server (3) as well as transmitting up-to-date status information to any browsers (5) active in the auction, would also be repeated any time that a revision event was detected and that the increment software (17) recalculated the predetermined bid increments with respect to the particular auction lot being auctioned. Similarly, a status update and retransmission of information would also take place upon detection of an auction-closing event, which resulted in the closing of the auction and acceptance of no further bids by the server (3).

The initial status information which would be set with respect to an auction in respect of opening bidding would be to set the opening auction price for the auction lot in question, as well as through the increment setting component (17) assigning or generating the initial predetermined bid increments pertaining to that auction lot, which are the initial predetermined bid increments at which bidders can place bids on the auction lots.

In terms of communication between the browser (5) and the server (3), it will be understood that other alternative formats to HTML are also available, including XML, JAVA™ or the like, and that any method of serving data from the server (3) to the bidder browser (5) and displaying it therein is contemplated within the scope hereof.

In any event, the information, shown at Step 4(b) in FIG. 4, displayed to bidders would include the current auction price of the auction lot as well as the predetermined bid increments which had been assigned and were currently active with respect to that particular auction.

As also outlined above, the bidder would need to identify themselves to the system (2) in order to place bids. The bidder might identify themselves at the time of transmitting their bid, Step 4(c)/4(d), or there might be a Cookie or some other type of Web technology installed on the bidder computer (1) which would be used to identify the bidder in accepting the bid and attributing it to the proper bidder when stored in the Web site system (2).

The opening price assigned to the auction, which is also performed by the auction software component (18), could be calculated or accomplished in several ways. For example, there might be an opening price stored with respect to that auction lot (24) in the Web site system (2) and the auction control system (18) might then simply extract that information and set that as the opening price for the auction lot (24). Alternatively, the auction software (18) might set the auction to open at a price of zero, or any number of other calculations could be contemplated to provide an opening auction price for the merchandise lot (24), and insofar as all such variations are not directly relevant to the adaptive predetermined bidding increments at the heart of the present invention, all such variations are contemplated within the scope hereof.

In addition to a strictly automated electronic auction, an additional variation on the present invention which is contemplated would be the participation of a live auctioneer in an auction in accordance with the present invention. A webcast of some variety, whether that be an audio webcast of the actual auctioneer or video webcast or other multi-media broadcast of different lot information or the like, could be coupled with the supervision and operation of the auction of the present system (2) by a live auctioneer. The auctioneer could, in traditional fashion, manually trigger the revision of predetermined bid increments (11), ie. revision events (20); and could also gauge the proper timing for the closing of an auction which could at that point be manually closed, ie. auction-closing event (21).

It will also be understood that in addition to the strictly online embodiments of the bidding process of the present invention outlined above, a live auction element could also be added to the present invention wherein people could physically attend an auction sale with or without an auctioneer and physically place bids on a lot (24) for sale at the same time as or in place of online bidders by use of a browser (5) or terminal placed at the auction room for the use of the bidders in attendance or for the use of a clerk in attendance to record all of the bids by various bidders. Again, it is the adaptive nature of the predetermined bid increments (11) which is at the heart of the present invention.

It is specifically contemplated that the auction system (2) of the present invention particularly lends itself to a "live" Internet auction, that is to say an auction taking place at a particular time with the participation of an auctioneer and taking place only for a short period of time. It will also be understood, however, that with necessary modifications the system of the present invention could also be applied to a static auction such as one carried out on eBay™ or the like, and that the use of the system of the present invention in either a live or static online auction format is contemplated within the scope of the present invention.

Conclusion

While the invention has been described herein with reference to certain preferred embodiments, these embodiments have been presented by way of example only, and not to limit the scope of the invention. Accordingly, the scope of the invention should be defined only in accordance with the claims that follow. In the following claims, reference characters used to designate claim steps are provided for convenience of description only, and are not intended to imply any particular order for performing the steps.

We claim:

1. A method of conducting an online auction comprising:
   a) providing an auction web site system including a merchandise database of information pertaining to auction lots to be sold;
   b) with respect to an auction lot, using said web site system to conduct an auction in the following steps:
      i) assigning an opening auction price and a plurality of predetermined bid increments to said auction;
      ii) displaying to a bidder the current auction price of said lot as well as said predetermined bid increments;
      iii) inducing bidders to place a bid by selecting from said plurality of predetermined bid increments wherein selecting a bid increment simultaneously transmits details of said bid to said web site system and records said bid in said web site system, and wherein the amount of a bid is the current auction price plus the selected predetermined bid increment;
      iv) upon occurrence of a revision event, revising said predetermined bid increments and refreshing the display of said revised predetermined bid increments to bidders; and
      v) upon occurrence of an auction-closing event, accepting no further bids and determining the winning bidder based on bids having been stored in said web site system, wherein said revision event comprises the detection of a preprogrammed condition by said web site system, and wherein said preprogrammed condition is related to the passage of a certain period of time during which there are no bids placed.

2. The method of claim 1 wherein the winning bidder is the bidder having submitted the highest valid bid stored in said Web site system.

3. The method of claim 1 wherein said auction-closing event comprises a manual trigger initiated by an operator of the web site system.

4. The method of claim 1 wherein said auction-closing event comprises the detection of a second preprogrammed condition by said web site system.

5. The method of claim 4 wherein said second preprogrammed condition is related to the passage of time between placement of bids.

6. The method of claim 1 wherein the revision of predetermined bidding increments comprises the recalculation of the predetermined bid increments by the web site system.

7. The method of claim 1 wherein the revision of predetermined bidding increments comprises lowering the predetermined bid increments.

8. The method of claim 1 wherein information from the Web site system is displayed to a bidder via a bidder browser in communication with said Web site system.

9. A web site system for conducting auctions, said web site system being operatively connected to communicate with bidders, said web site system comprising:
   a) a bid management system which manages a bid database containing details of bids placed by bidders in respect of auction lots;
   b) an auction control system which includes an increment-setting component which will set predetermined bid increments in respect of auction lots being auctioned, which auction control system will conduct an auction of an auction lot in the following steps:
      i) assigning a current auction price to said auction lot;
      ii) via said increment-setting component, assigning a plurality of predetermined bid increments to said auction;
      iii) displaying to prospective bidders the current auction price and predetermined bid increments;
      iv) inducing bidders to place bids in said auction by selecting one of said predetermined bid increments, wherein selecting a bid increment simultaneously transmits details of said bid to said web site system and records said bid in said web site system, and wherein the amount of a bid is equal to the current auction price plus the selected predetermined bid increment;
      v) upon acceptance and recordal of a bid, refreshing the display of the current auction price to bidders;
      vi) monitoring the auction for the occurrence of a revision event and upon the occurrence of same, using the increment-setting component, revising the predetermined bid increments and refreshing the display of the revised predetermined bid increments to bidders; and
      vii) monitoring the auction for the occurrence of an auction-closing event and upon the occurrence of same, accepting no further bids and determining the successful bidder based on bids stored in the bid database, wherein the revision event is a preprogrammed condition which is detected by said auction control system, and wherein the preprogrammed condition is related to the passage of a certain period of time during which there are no bids placed.

10. The web site system of claim 9 wherein a bidder communicates with said web site system from a bidder computer.

11. The Web site system of claim 10 wherein the bidder computer contains a bidder browser operatively connected to and able to communicate with said Web site system.

12. The web site system of claim 9 wherein the increment-setting component revises the predetermined bid increments within an auction based on input from an operator of said web site system.

13. The web site system of claim 9 wherein said increment-setting component revises the predetermined bid increments within an auction by recalculation based on one or more preprogrammed profiles.

14. The web site system of claim 9 wherein the auction-closing event is a manual trigger initiated by an operator of the web site system.

15. The web site system of claim 9 wherein the auction-closing event is a second preprogrammed condition which is detected by said auction control system.

16. The web site system of claim 15 wherein the second preprogrammed condition is related to the passage of time between placement of bids.

* * * * *

UNITED STATES PATENT AND TRADEMARK OFFICE
CERTIFICATE OF CORRECTION

PATENT NO. : 7,617,145 B1  Page 1 of 1
APPLICATION NO. : 09/695551
DATED : November 10, 2009
INVENTOR(S) : Roe Peterson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this

Nineteenth Day of October, 2010

David J. Kappos
*Director of the United States Patent and Trademark Office*